March 28, 1939. L. DEVAUX ET AL 2,151,901
APPARATUS FOR THE MEASUREMENT OF RADIATING ENERGY SUCH AS EXPOSURE METERS
Filed March 13, 1937 2 Sheets-Sheet 1

INVENTORS
LUCIEN DEVAUX
RENE ALPHONSE HIGONNET.
BY
ED Phinney
ATTORNEY

March 28, 1939.  L. DEVAUX ET AL  2,151,901

APPARATUS FOR THE MEASUREMENT OF RADIATING ENERGY SUCH AS EXPOSURE METERS

Filed March 13, 1937   2 Sheets-Sheet 2

INVENTORS
*LUCIEN DEVAUX*
*RENE ALPHONSE HIGONNET*
BY
E. D. Kinney
ATTORNEY

Patented Mar. 28, 1939

2,151,901

UNITED STATES PATENT OFFICE 2,151,901

APPARATUS FOR THE MEASUREMENT OF RADIATING ENERGY SUCH AS EXPOSURE METERS

Lucien Devaux and René Alphonse Higonnet, Paris, France, assignors to International Standard Electric Corporation, New York, N. Y.

Application March 13, 1937, Serial No. 130,746
In France March 14, 1936

4 Claims. (Cl. 88—23)

This invention relates to apparatus used for the measurement of radiating energy, such as exposure meters and namely to various improved arrangements used in said apparatus.

According to certain features of invention, an apparatus of this type comprises two shells fitting in one another and or in which are located elements such as: photoelectric cells, optical device, micro-ammeter, calculating device.

According to other features of the invention, means are also provided to enable the use of such apparatus for the measurement of energy either directly radiated by a source or reflected by a field of view of which it is desired to measure the amount of irradiation.

These and other features of the present invention will be explained in detail by the following description in relation with the attached drawings in which.

Figure 1:
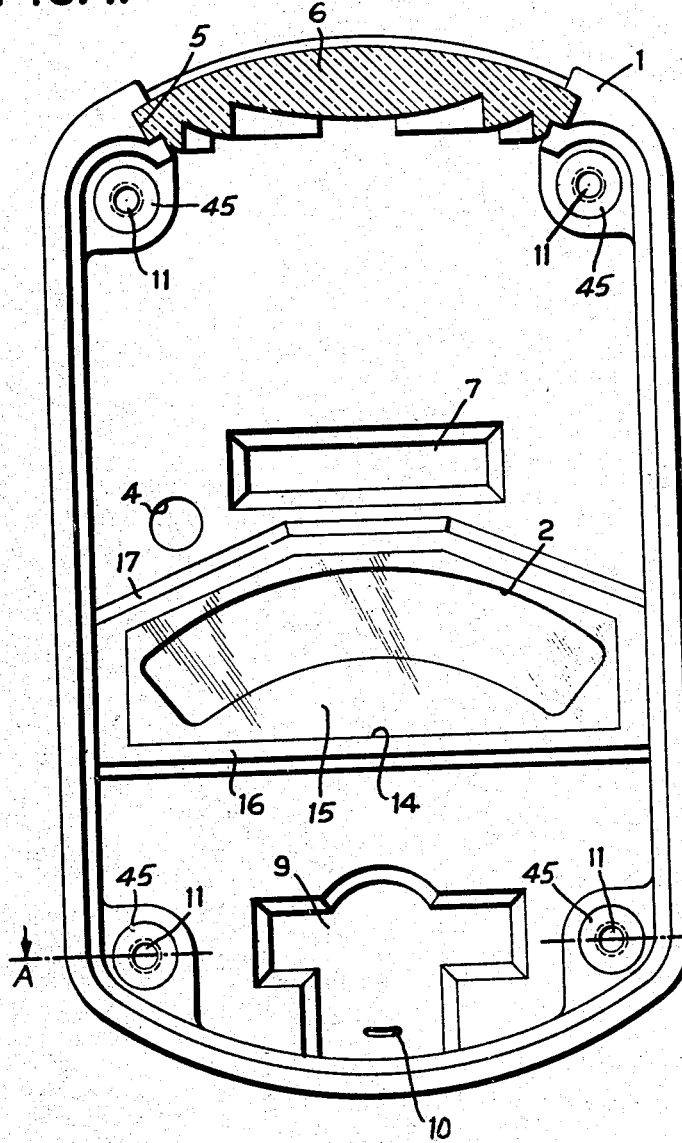
Figure 1 is a front view of the inside part of one half shell in which are provided openings allowing to see the indications of the apparatus.
Figure 2:
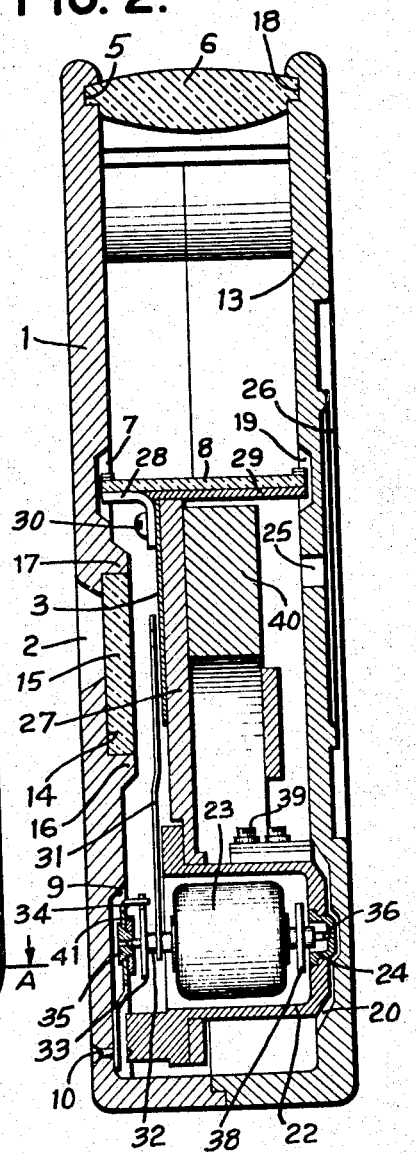
Figure 2 is a sectional longitudinal view of the complete apparatus with the exception of the calculating device.
Figure 3:
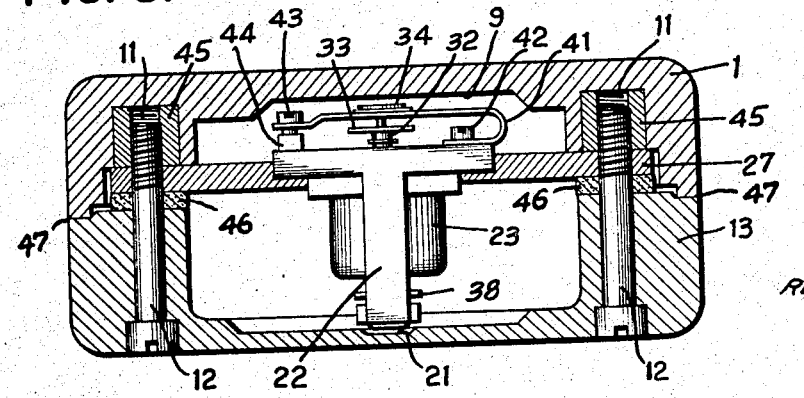
Figure 3 is a transversal sectional view along line AA of apparatus shown on Figures 1 and 2.

In Figures 1, 2 and 3, which relate to a particular form of exposure meters embodying certain features of the invention, the same numerals are used for denoting the same elements in the three figures.

In these figures, 1 represents a half shell in molded material provided with opening 2 permitting to see the dial 3 of the micro-ammeter and the opening 4 for an adjusting knob (not shown) used to modify the range of sensitivity of the micro-ammeter; grooves 5 are used to maintain one edge of the spherical stepped lens 6; depressed portions 7 serve to locate one edge of the photoelectric cell 8 and the depressed portion 9 serves to locate the adjusting device of the micro-ammeter; at the bottom of that portion 9 is an opening 10 permitting the introduction of a pin to control said adjusting device. Holes 11 are used for locating the two clamping screws 12 of the two half shells 1 and 13, and also a depressed part 14, limited by protruding parts 16 and 17, serves to locate the transparent plate 15.

Figure 7:
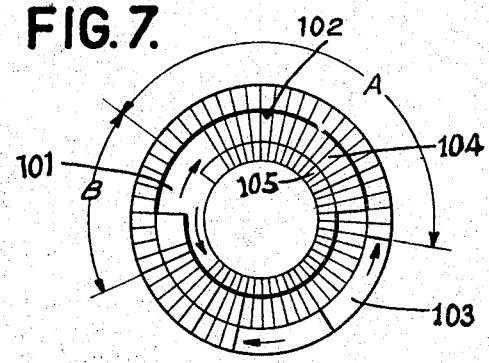
Figure 7 shows an improved calculating device which can be used for instance with such exposure meters.

The half shell 13 is provided with a groove 18 to maintain the other edge of the lens 6 and of a depressed portion 19 to locate the other edge of the photoelectric cell 8. Another depressed portion 20 is used to locate the frame 22 of the moving coil 23 of the micro-ammeter, said portion being further depressed at 21 to locate the ball bearing 24 of moving coil 23. The half shell 13 is further provided with a hole 25 for the shaft (not shown) of the calculating device such as illustrated in Fig. 7, and is externally shaped as shown at 26 to allow the fixation of the dial of the calculating device.

The assembly of the photoelectric cell and the micro-ammeter is shown in detail on Figures 2 and 3. These two elements are supported by a common frame 27. At one end of said frame the photoelectric cell 8 is fixed by a bracket 28 integral with a supporting plate 29, said bracket being also used to hold on frame 27 the dial 3 of the micro-ammeter as by screw 30. In front of dial 3 moves an index 31 carried on the spindle 32 of the moving coil 23. The spindle 32 carries also on the same side as index 31 with respect to coil 23 a restoring spring 33, one end of which is fixed on spindle 32 and the other end is fixed to a bent rod 34 which traverses the bearing 35 of spindle 32 and bears against half shell 1 in front of the elongated opening 10 in which a small pin can be introduced to control the tension of spring 33. The moving coil 23 is surrounded by a cup shaped housing 22 which is viewed in a T form on Figure 3, said housing 22 resting on frame 27 and serving to carry by means of bearing 24 and pivot 36 the spindle 32 of moving coil 23. On that part of spindle 32 is also carried another restoring spring 38. The cup shaped housing 22 is fixed on the frame 27 by screws 39, Fig. 2. The magnet 40 is also supported by the frame 27.

Referring to Figure 3, the adjusting device for spindle 32 is clearly shown and comprises a spring blade 41 fixed to the cup shaped housing 22 by a screw 42 at one end and at his other end to an adjusting screw 43 which can be screwed in a protruding portion 44 of the housing 22.

The mode of assembly of the two half shells and of the elements of the exposure meter is also clearly visible on said Fig. 3. The half shell 1 is provided with holes 11 for molded in elements 45 in which are screwed the screws 12 which clamp the frame 27 between the two shells 1 and 13 by means of resilient clamping washers 46, the shells as shown at only in close contact.

3. being of the above construction a simple mode of assembly of the different elements is obtained, the inner elements forming a unitary block by means of the common frame 27, and being not linked by any organ to the two half shells 1 and 13 making up the housing of the apparatus.

Figure 4:
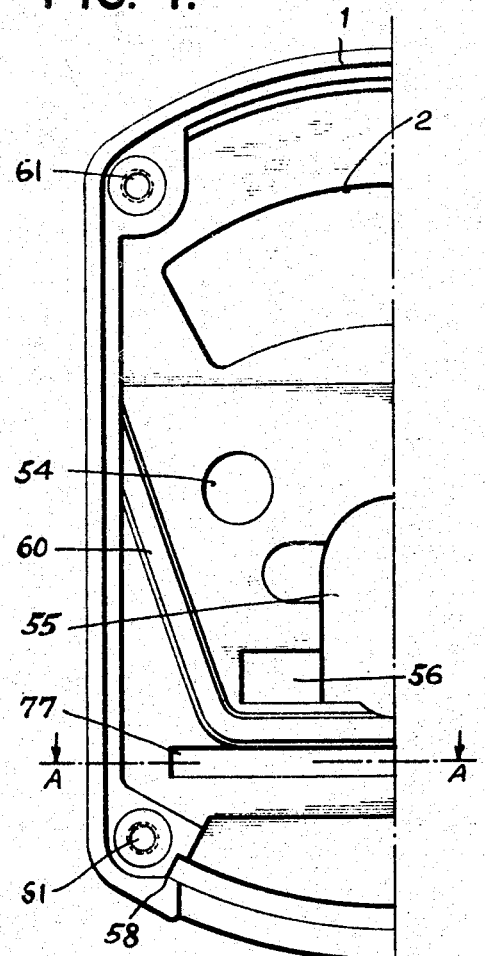
Figure 4 is a half front view of another form of shell used in a modified form of apparatus.
Figure 5:
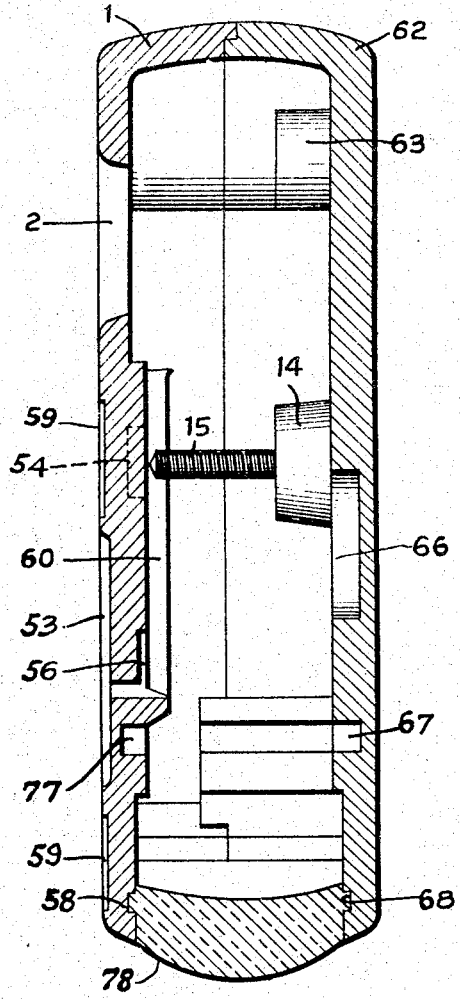
Figure 5 is a sectional longitudinal view of the shell used in such a modification.
Figure 6:
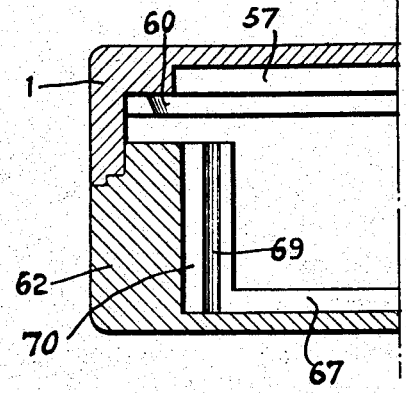
Figure 6 is a half sectional transversal view along line AA of the shell of Figure 5.

Figures 4, 5 and 6 represent a modified form for the housing an exposure meter making use of certain features of the invention. In these figures, 1 represents a half shell of molded material provided with an opening 2 for viewing the dial of the micro-ammeter, an opening 53 for the adjusting element of the calculating device and depressed portions 54 for the bearing rods of the dial and of the moving coil apparatus, 55 and 56 for the location of the supporting frame of the moving device, 57 for one edge of the photoelectric cell and 58 for the holding of one edge of the toroidal lens 78. On its outer face the half shell has in addition a ring shaped depressed portion 59 for the dial of the calculating device. A reinforcing rib 60 is provided as shown. The two half shells are joined by screws the housings of which are shown at 61. The half shell 62 is provided on its inner face with a spacing piece 63 for supporting the magnet and two blocks 64 integral with the half shell 62 in which are embedded the ends of two screws 65 used to hold the assembly of a micro-ammeter including the magnet. In addition depressed portions 66, 67 and groove 68 are provided respectively to locate the bearing of the moving device, the photoelectric cell, and the toroidal lens 78. Figure 6 shows the manner of holding the photoelectric cell which bears upon the bottom of depression 67 on an embossed part 70 provided with a groove 69 in which a blocking rod not shown can be forced. The other end of cell is held in a similar manner but the groove for the blocking rod is provided on the other face of the housing with respect to that shown on the figure.

An improved type of calculating device which can be used namely but not exclusively with these two forms of exposure meter is provided to give useful indications for two different types of measurements for determining time of exposure. This device which is shown on Figure 7 is represented in the form of a circular slide rule of which a movable scale 101 is outlined on the drawings in heavy lines. This movable scale 101 carries an index 102 and double scales 104, 105 corresponding to the characteristics of different film which may be used. The fixed dial 3 shows on its periphery two graduation scales A and B placed one following one another. The first scale A is normally used when the illumination is sufficient so as the light reflected by the view field, the brilliancy of which has to be determined, is sufficient to give an indication on the exposure meter. The second scale B is used when the brilliancy of the view field is deficient. In the latter case, the exposure meter may be used to measure the illumination of the field of view by measuring the radiation directly from the source of light. The utilization of scale A would evidently give too short an exposure time under conditions of poor illumination. Said B placed ahead of scale A on the periphery of the fixed dial will give a longer, more convenient exposure time. If the exposure time change determined by the passage from scale graduation to another is $a$ and the shift between scales A and B is $b$ graduations, then the change of exposure time in shifting from one scale to the other will be $a^b$.

In a specific example considered, scale A is composed of twelve units and twenty-four scale graduations, and scale B of five units and nine graduations. The change in exposure time determined by the passage from one graduation to another on scale A is $\sqrt{2}$. For scale B this same exposure time will be changed to a shift of nine graduations and consequently will be $(\sqrt{2})^9$, or approximately 22.5 times as great as for scale A. This value corresponds to the average ratio between directly received and reflected light. The lack of sensitivity of a photo-sensitive light meter is consequently largely compensated by this arrangement.

Although in the above description a spherical stepped lens has been illustrated in connection with Figs. 1, 2 and 3, and a toroidal lens is disclosed in connection with Figs. 4, 5 and 6, it is to be understood that a spherical lens, a stepped spherical lens, or a toroidal lens may be used with either embodiment depending on the value of the viewing angle desired. The toroidal lens and its mode of mounting permit to obtain a useful angle in the vertical plane not exceeding a certain value as for instance 60 degrees which correspond to the normal value for eliminating the influence of a too luminous background as for instance, the sky. The horizontal view field on the contrary should rather be increased, as its illumination is generally nearly a uniform one.

What is claimed is:

1. In a photo-electric light measuring device having a lens and photo-electric cell aligned along the optical axis, a casing comprising two separate unitary parts which fit together substantially along said optical axis and form an opaque covering open at one end, said lens being adapted to close the open end of said casing, aligned recesses in each of said casing parts adjacent said open end for solely supporting said lens and maintaining it in aligned position, said photo-electric cell being mounted within said casing in a plane spaced a predetermined distance from said lens, aligned recesses in each of said casing parts in said predetermined plane for maintaining said photo-electric cell in a predetermined aligned position, and means for fastening said casing parts together, said casing parts serving to retain the parts of said device in position independently of other fastening means.

2. Apparatus as claimed in claim 1, in which said lens is a toroidal lens for producing different desired viewing angles in the horizontal and vertical planes.

3. Apparatus as claimed in claim 1, in which said lens comprises a spherical stepped lens.

4. A photo-electric light measuring device in accordance with claim 1, further comprising a meter responsive to the illumination of said light sensitive cell adapted to be mounted in said casing, a scale on said meter, an opening in said casing, and means comprising further recesses in said casing parts for maintaining said meter in position within said casing in alignment with said opening.

RENE ALPHONSE HIGONNET.
LUCIEN DEVAUX.